Aug. 29, 1933.  A. E. ALMGREN  1,924,146
CAN FEEDING MECHANISM
Filed April 15, 1931  3 Sheets-Sheet 1

INVENTOR
August E. Almgren
BY John C. Carpenter
ATTORNEY

Aug. 29, 1933.   A. E. ALMGREN   1,924,146
CAN FEEDING MECHANISM
Filed April 15, 1931   3 Sheets-Sheet 3

INVENTOR
August E. Almgren
BY John C. Carpenter
ATTORNEY

Patented Aug. 29, 1933

1,924,146

UNITED STATES PATENT OFFICE 1,924,146

CAN FEEDING MECHANISM

August E. Almgren, Hillside, N. J., assignor to American Can Company, New York, N. Y., a Corporation of New Jersey Application April 15, 1931. Serial No. 530,313

6 Claims. (Cl. 198—23)

The present invention relates, in general, to can feeding mechanism and has more particular reference to the transfer of filled cans from a conveyor to a machine, such as a top seamer, wherein the cans are brought into proper timing without spilling the contents thereof.

In feeding filled cans to a top seamer, it is the practice to deliver them in untimed relation, from any suitable machine such as a filling machine to the end of a conveyor where they may accumulate without definite progressive movement and from whence they are to be fed in spaced time relation to the seamer, without the spilling of the contents of the cans. This requires a picking up and indexing of the filled cans in succession and without sudden jarring or jerking movement, easily bringing the cans from their slow-moving travel into a slightly higher speed of travel, regardless of the exact position of the cans as they are thus engaged.

The principal object of the invention is the provision of an improved feeding mechanism for receiving cans in untimed relationship and positively engaging them in succession and spacing them apart during which time they are conveyed at a slightly higher speed without spilling of their contents.

An important object of the invention is the provision of a can feeding mechanism utilizing propelling and spacing fingers which bring the cans into proper spaced relation and maintain them so spaced during their introduction into a machine.

The present invention contemplates the use of an endless conveyor moving at a given rate of travel, and a cooperating endless indexing chain, moving at a slightly righer rate of travel in order to pass through an effective can engaging zone and at such time to gain a distance of travel over the travel of the conveyor equal to or exceeding the width of a can so that a can in whatever position it may be on the conveyor will always be properly engaged by the indexing chain, prior to introduction of it into a machine.

A further important object of the invention is the provision of can feeding fingers pivotally mounted on a continuously moving indexing chain and which yield to prevent damage to the can in the event that engagement therewith is improper.

Numerous other objects of the invention will be apparent as it is better understood from the following description, which, taken in connection with the accompanying drawings, discloses a preferred embodiment thereof.

Referring to the drawings.

While it has been previously suggested that the invention is particularly adapted to a can feeding mechanism for cans passing between a filling machine and a can top closing machine, it will be evident that such machines constitute but one condition where can feeding is used and that many other uses may be found to which the disclosed feeding mechanism is equally well adapted. With this in mind, the drawings, somewhat sketchily, illustrate a machine designated in general by the numeral 11 which may be a seaming machine and into which the cans are to be conveyed after being brought into proper spacing and timing.

Figure 3:
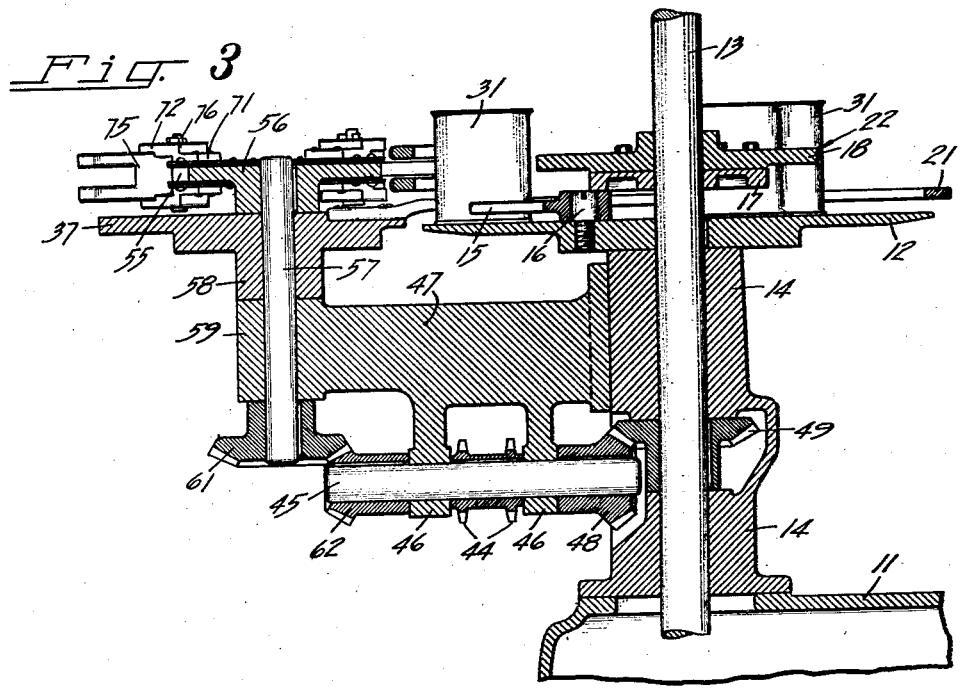
Fig. 3 is a transverse sectional view taken substantially along the line 3—3 in Fig. 1.

The machine 11 may be provided with a circular transfer disc 12 on which the cans are positioned by the feeding mechanism. The disc 12 is secured for rotation to a vertical shaft 13 (Figs. 1 and 3) constituting one of the driving elements of the machine. The shaft 13 is journaled for rotation in bearings 14 formed in the machine 11, the upper of these bearings 14 acting as a support for the disc 12.

Transfer arms 15 are preferably used in such a machine and these are pivotally mounted on studs 16 threadedly engaged in the disc 12. Each arm may be moved on its pivot by means of a cam 17 bolted to a stationary plate 18 forming a part of the machine 11. The improved can feeding mechanism embodying the present invention delivers cans onto the upper surface of the disc 12 and individually in front of the transfer arms 15 after which they are conveyed by movement of the disc 12, under the control of the cam 17, as previously described.

During the passage of the cam into the machine, its line of travel may be determined by an outer guide ring 21, carried in the machine 11 which cooperates with a circular guide surface 22 formed in the plate 18.

Filled cans 31 (Figs. 1 and 2) are delivered from the filling or other machine onto a trackway 32 provided with side guide rails 33, 34, mounted on brackets 35, 36, supported on a table 37 extending throughout the effective zone of operation of the can feeding mechanism. The table 37 (Fig. 2) at one end is carried on the frame of the machine and at the other end on a column 40 resting on the floor.

A can conveyor is provided which comprises a pair of spaced endless chains 38 (Figs. 1 and 2) operating on the table 37, the upper run of the chains moving within slots 39 formed in the trackway 32. It is on the upper surface of this section of the conveyor that the cans 31 are delivered for timing or spacing.

The conveyor 38 is or may be arranged on a line to intersect the can-receiving element 12 (Fig. 1), so that deflection of the cans on the conveyor from their line of travel is not required to place the cans on the can-receiver.

Figure 2:
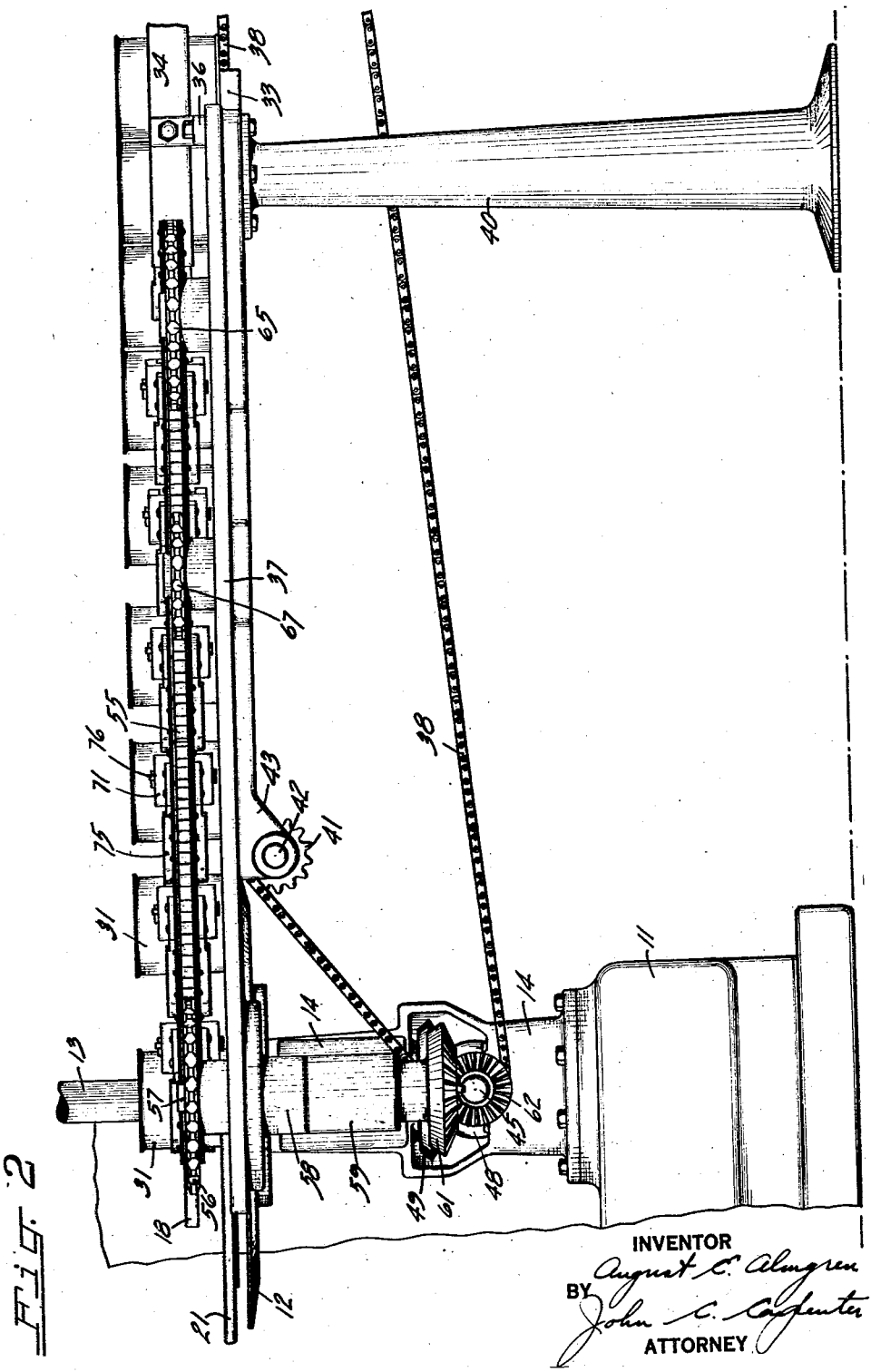
Fig. 2 is a side elevation, part of the indexing chain being removed, of the apparatus disclosed in Fig. 1.

The conveyor chains 38 operate over idler sprockets 41 mounted on a horizontal shaft 42 which is journaled in bearings 43 formed in the table 37. The chains 38, forward of the idler sprockets 41, extend downwardly at an angle as shown in Fig. 2 and engage sprockets 44 (Fig. 3) carried on a horizontal shaft 45 journaled in bearings 46 formed in a bracket 47 mounted upon and extending outwardly from the machine 11 adjacent the upper bearing 14.

The shaft 45 carries a bevel gear 48 which meshes with a similar gear 49 keyed to the shaft 13 intermediate the bearings 14. The shaft 45 is thus constantly rotated by its inter-geared connection with the drive shaft 13 of the machine. The conveyor chains 38 also pass over other suitable idler sprockets which may be mounted on the filling machine.

Figure 1:
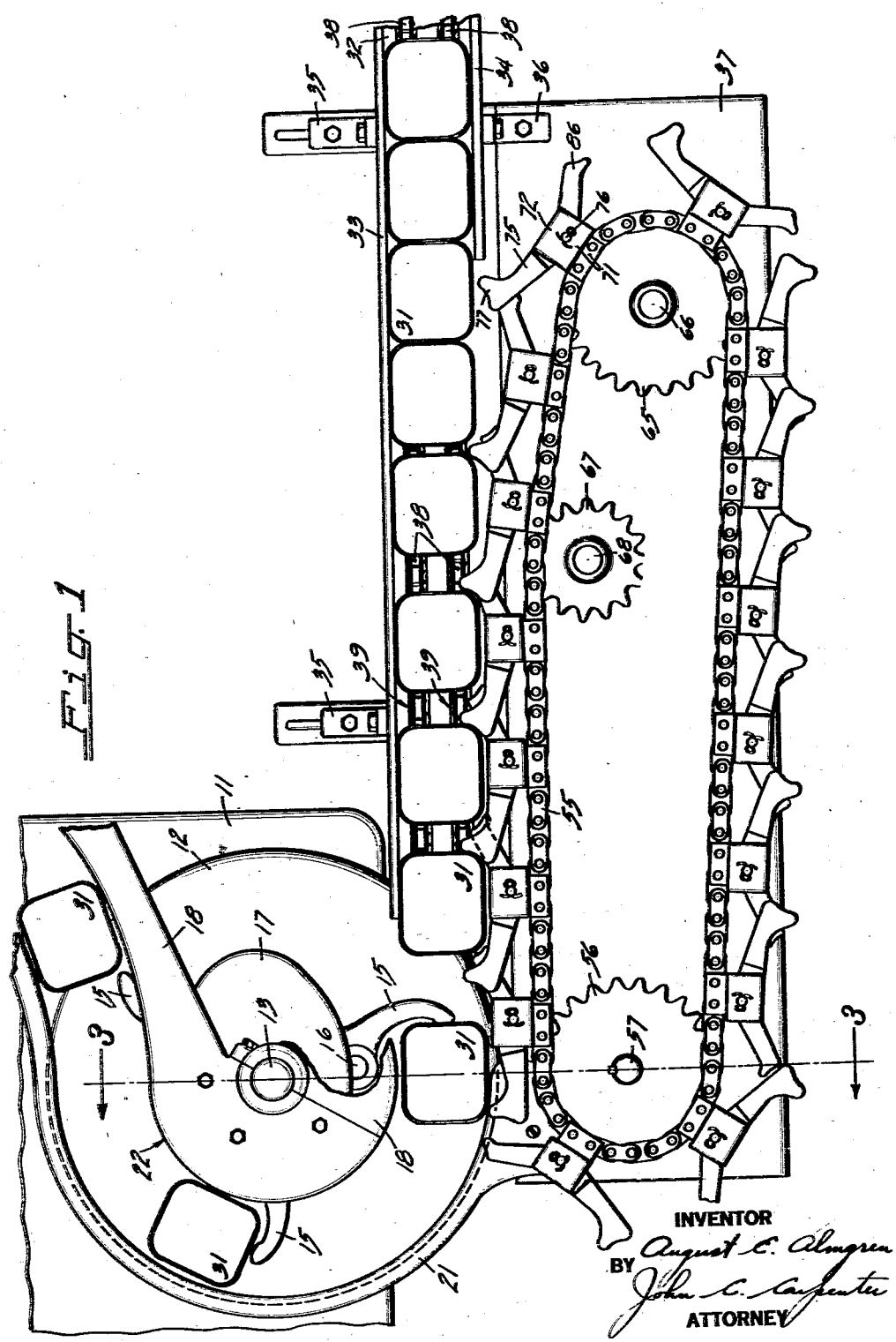
Figure 1 is a plan view of feeding mechanism constructed in accordance with the principles of the present invention, such a mechanism being illustrated in connection with parts of a can machine.

As illustrated in Fig. 1, the guide rail 34 terminates at some distance from the machine 11 and between its end and the machine itself is located a continuously moving indexing chain 55 which passes over a driving sprocket 56 keyed to the upper end of a vertical shaft 57 (see also Fig. 3) journaled in a bearing 58 formed in the table 37 and in a bearing 59 formed in the bracket 47. The shaft 57 at its lower end carries a bevel gear 61 which meshes with a similar gear 62 mounted on the horizontal shaft 45.

The indexing chain 55 also passes adjacent the outer end of the table 37 and over an idler sprocket 65 rotating on a stub shaft 66 carried by the table 37. This chain 55 also takes over an idler sprocket 67 located intermediate the sprockets 56, 65 and rotating on a vertical stub shaft 68 carried by the table 37. The section of the indexing chain 55 intermediate the sprockets 56, 67 is parallel to the conveyor chains 38 while the chain section intermediate the sprockets 67, 65 is at an angle thereto. This permits gradual approach to the conveyor of a chain section passing from the sprocket 65 to the sprocket 67 for a purpose hereinafter set forth. The idler 67 constitutes means for holding the rear portion of the operative limb of the indexing chain at an angle to the conveyor and for holding the forward portion of it substantially parallel with the conveyor.

The relation of the gearing 61, 62 (Fig. 3) which connects the associated shafts 45, 57 is such as to cause the indexing chain 55 to travel at a higher rate of travel than the conveyor chains 38 by a definite predetermined amount so that points on the chains 55 will gain a certain traveled distance in passing between the sprockets 65, 56 in excess of the distance covered at the same time by a given point on the conveyor chains 38 adjacent that zone of travel, this action providing proper timing of the cans delivered into the machine 11.

Figure 4:
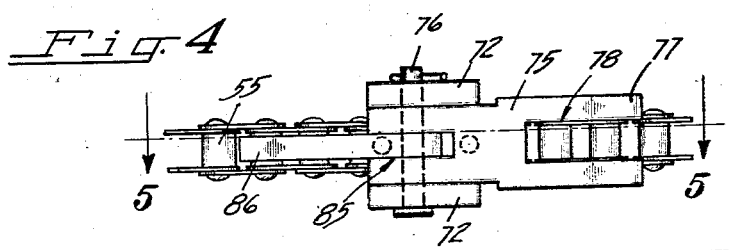
Fig. 4 is an inner face detail of one set of can feeding fingers, connected with a section of the indexing chain.

Certain links of the indexing chain 55 are formed as blocks 71 (Figs. 1, 4 and 5) provided with outwardly extending spaced side walls 72. These walls enclose a pocket 73 therebetween in which is mounted for pivotal movement certain fingers which cooperate with the indexing chain to engage successively the cans 31 carried on the conveyor chains 38 in order to space and properly time them.

Figure 5:
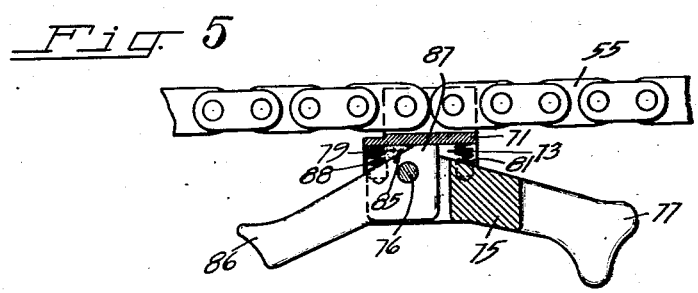
Fig. 5 is a sectional detail, being taken substantially along the line 5—5 in Fig. 4, parts of the indexing chain being illustrated in elevation.

Such fingers comprise a series of propelling fingers 75 extending at one end thereof into the pockets 73, each finger being pivoted on a pin 76 carried in the side walls 72. The outer end of each finger is formed as a pair of spaced extensions 77 enclosing a slot 78. Each finger 75 also projects beyond its pivot 76 and forms a stop end 79 which engages against the block 71, as illustrated in Fig. 5. A spring 81 interposed between the block 71 and the finger 75 normally holds the extension end 77 of the latter outwardly with its stop end 79 against the block 71.

The stop end 79 of each finger 75 is slotted at 85 to provide clearance for a spacing finger 86 which is also pivoted on the pin 76 and which has independent movement within the pocket 73. Each spacing finger 86 is also extended beyond the pivot 76 to provide a stop end 87 for engagement against the block 71 in a manner similar to that of the propelling finger 75. A spring 88 is interposed between the block 71 and the finger 86 which normally holds the latter in outward position, as illustrated in Fig. 5.

The extensions 77 of a supporting finger 75 are brought into engagement with a can 31 in the trackway 32 as each set of fingers 75, 86 with their associated block 71 passes over the idler sprocket 65 and toward the sprocket 67. If the finger strikes against the side wall of the can, (the position of an untimed can determining how such engagement takes place), its spring 81 yields without interfering with the continued forward travel of the finger with the indexing chain 55.

The finger 75 being advanced by the indexing chain 55 at a greater rate of speed than the can resting upon and carried by the conveyor chains 38, the engaged end 77 of the finger slowly slides along the engaged wall of the can 31 advancing the finger toward the front wall of the can. Prior to reaching the sprocket 56 the rounded nose of the finger end 77 is carried beyond the rounded corner of the can and the finger moves ahead and free of the engaged can wall. It is then in its fully extended position being so moved by its spring 81, its stop 79 being in engagement with the block 71.

The extended finger then catches up with and engages the can immediately ahead. A can so engaged is under the control of the chain 55 and is in proper time for deposit into a transfer arm 15 of the machine 11. Such a can is advanced at a slightly greater speed of travel than the travel of the conveyor chains 38, the same sliding over the smooth upper surface of the chains during this movement.

It sometimes happens that the advancing finger 75 comes in between two properly positioned cans in the trackway and in such an event the finger picks up the forward can and immediately increases its travel, the can being under the influence of the carrier chain and maintaining its proper timing therewith.

The spacing finger 86 during a sliding engagement with the wall of a can 31, as just described, strikes against the can wall of the following can in the trackway 32 and slides along its wall until the propelling finger 75 properly engages and times its can, the spring 88 of the finger 86 yielding to permit this sliding action. When the forward end of a propelling finger 75 is moving the timed can forward, the can following is in between the associated fingers 75, 86 (Fig. 1) and will be engaged and propelled by the next adjacent finger 75.

The rear end of the finger 86 is in a position to block or prevent following cans from crowding forward. In other words, the spacing of the can line is maintained, each timed can 31 being propelled forward by a finger 75 pivoted on its block 72 and being prevented from moving forward by a spacing finger 86 associated with the second block 72 forward.

The speed of travel of the indexing chain 55 is in excess of the travel of the conveyor chains 38 by an amount which will move a propelling finger 75 ahead of a given point on the conveyor chain at least the full width of one can throughout its feeding zone, or between the time that the finger first engages a can 31 in the trackway 32 and when the can is delivered into one of the transfer arms 15 of the machine 11. This is to insure that every can in the trackway 32 will be properly engaged and timed and where a finger 75 engages the wall of a container near its rear end, this being the extreme condition, the finger will slide along the can wall far enough to bring the can ahead in time before it is released from the chain 55.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A can feeding mechanism, comprising an endless conveyor for moving cans to a machine, an endless indexing chain mounted for operation adjacent said conveyor, means for moving said conveyor and said chain in the same direction of travel and at different rates of speed, devices carried by said chain for bringing the cans into predetermined spaced relation on said conveyor, and other devices also carried by said chain for holding said cans in spaced position during their introduction into said machine.

2. A can feeding mechanism, comprising an endless conveyor for moving cans to a machine, an endless indexing chain mounted for operation adjacent said conveyor, means for moving said conveyor and said chain in the same direction of travel and at different rates of speed, and means including opposed pivoted fingers carried by said indexing chain for bringing and holding cans into predetermined spaced relation on said conveyor during their introduction into said machine.

3. A can feeding mechanism, comprising an endless conveyor for moving cans to a machine, an endless indexing chain mounted for operation adjacent said conveyor, and pivoted spring held fingers carried by said indexing chain and extending in opposite directions for engaging behind and in front of the cans on said conveyor for spacing them in relative position and for holding them spaced on said conveyor prior to their introduction into said machine.

4. A can feeding mechanism, comprising in combination, a continuously moving conveyor for advancing cans toward a machine, an indexing chain continuously moving adjacent said conveyor and at a greater rate of travel, can propelling fingers pivotally mounted on said chain and engaging the cans on said conveyor to space them in predetermined relation, and yielding means associated with said fingers for permitting their pivotal movement into depressed positions until the cans engaged by them are brought into their said spaced relation.

5. A can feeding mechanism, comprising in combination, a continuously moving conveyor for advancing cans toward a machine, an indexing chain, means for moving said chain at a greater speed of travel than said conveyor thereby bringing sections thereof successively adjacent said conveyor, and fingers mounted on said chain and yieldingly engaging said cans during their passage adjacent said conveyor, said chain moving means advancing a said finger during such passage a distance in excess of that traversed by said conveyor by an amount not less than the width of a can being conveyed.

6. A can feeding mechanism, comprising an endless conveyor, an endless indexing chain, a limb of which is arranged for advancing and spacing cans on said conveyor, and means for directing the rear part of said limb at an angle to the conveyor and directing the forward propelling part of said limb substantially parallel with the conveyor.

AUGUST E. ALMGREN.